United States Patent [19]

Jones

[11] 4,043,497
[45] Aug. 23, 1977

[54] FRICTION WELDING MACHINE

[75] Inventor: Emyr Jones, Bridgenorth, England

[73] Assignee: Clarke Chapman Limited, England

[21] Appl. No.: 728,492

[22] Filed: Sept. 30, 1976

[30] Foreign Application Priority Data

Nov. 12, 1975 United Kingdom ............... 46790/75

[51] Int. Cl.² ........................................... B23K 27/00
[52] U.S. Cl. ......................................... 228/2; 83/914;
90/24 A; 228/19; 228/13
[58] Field of Search ...................... 228/2, 13, 19, 112;
83/914; 90/24 A

[56] References Cited

U.S. PATENT DOCUMENTS

| 3,790,058 | 2/1974 | Filkorn | 228/2 |
| 3,800,996 | 4/1974 | Fuller et al. | 228/2 |

Primary Examiner—Al Lawrence Smith
Assistant Examiner—Robert C. Watson

[57] ABSTRACT

In a friction welding machine a shear tool is provided for shearing flash off the welded workpieces at the weld zone which tool is interposable between one workpiece holder and the flash only after the workpiece holder and the flash have been relatively moved apart. The workpiece holder and the weld zone are then relatively moved towards one another to force the shear tool and the weld zone to traverse relative to one another so that the flash is completely sheared off the weld zone.

10 Claims, 7 Drawing Figures

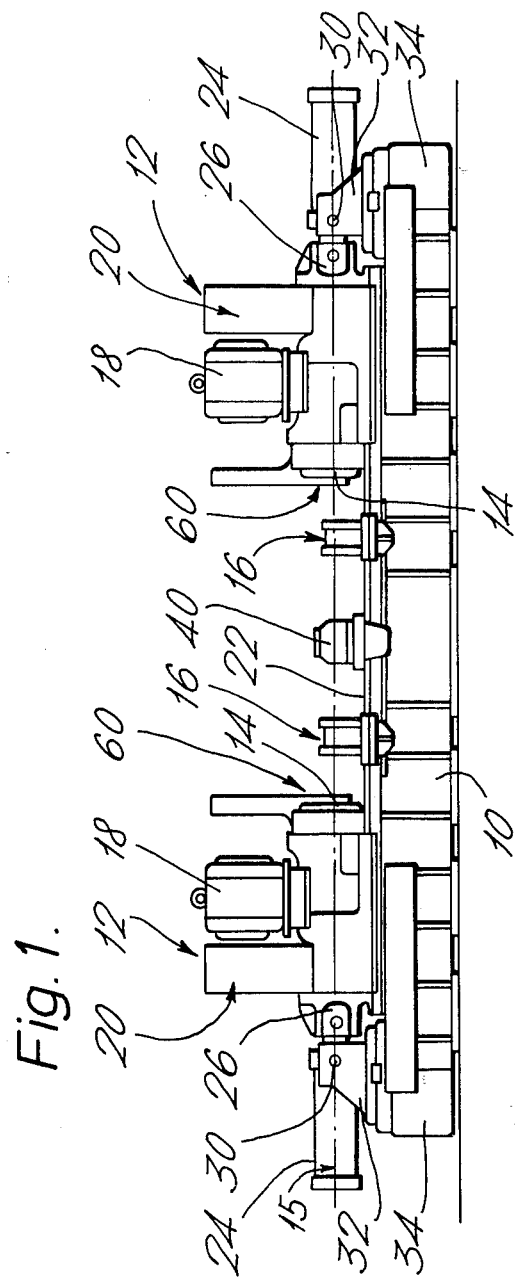

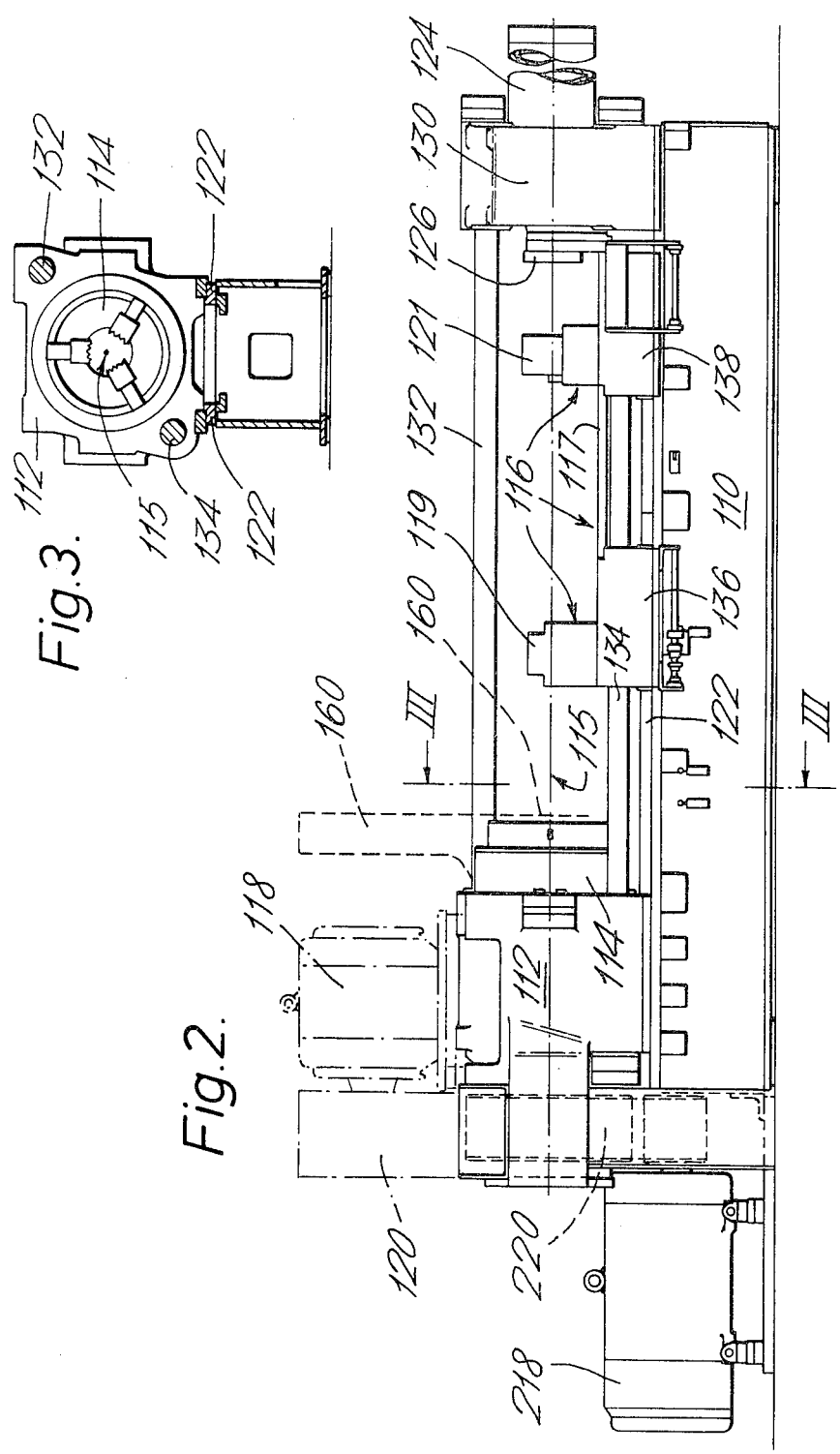

FRICTION WELDING MACHINE

BACKGROUND OF THE INVENTION

The invention relates to friction welding machines particularly machines having means for removing "flash" from the weld zone.

Friction welding machines having flash removal means are known but the problem of flash removal is not satisfactorily overcome by the known proposals. In particular, friction welding machines intended for use in high volume production work of high standard must grip both workpieces very close to the ends of the workpieces which are engaged during welding. Also, the mechanical construction of the machine must be kept simple so as to minimise the risk of malfunction of the machine in the production environment.

In one type of known machine (see for example U.K Pat. application Nos. 1,182,111 and 1,323,678), the flash is removed by a tool permanently secured to one of the workpiece holders. A backstop, which supported one of the workpieces against the high load applied during welding, must be displaced before the flash is removed in such machines.

This is unsatisfactory because:

i. the presence of the tool prevents one workpiece from being gripped sufficiently close to the weld face.
ii. the backstop mechanism which permits the backstop to be displaced is not practicable because it must be designed such as to be able to support very high loads and yet be releasable and displaceable in a simple and rapid manner. No such mechanism has to date been incorporated in machines used in high volume production.
iii. the tool cannot be readily re-ground and re-grinding holds up production.
iv. the presence of the tool permanently in the working space between the two workpiece holders makes the introduction and removal of workpieces difficult and further reduces production efficiency.

In a similar type of machine (see U.K. specification No. 1,323,812), the tool is permanently secured to one workpiece holder but instead of displacement of a backstop, the tool is positioned on the remote side of the weld zone from the workpiece holder to which it is attached. This requires that the tool be secured to the holder by a relatively long member and the considerable loads imposed on the tool during shearing of flash are clearly not adequately resisted by such an arrangement since the tool is not properly supported. The working space and access to it are both severely restricted.

In another type of machine flash is removed by a tool permanently mounted on a workpiece holder which is rotated about the weld zone (see U.K. specification No. 1,392,581) but this requires considerable complication in the construction of the workpiece holder on which the tool is mounted. The workpiece is gripped too far away from its weld face and the working space and access to it are severely restricted.

In another type of machine, flash is removed by a tool which cuts the flash as it is rotated relatively to the tool (see U.K. Specification No. 1,309,043).

In such a machine the removal of the flash produces swarf of a kind which is difficult to handle and which includes particulate swarf which cannot be removed from the working space and the machine eventually has to be stopped to enable the swarf to be cleared away. Obviously, this is totally unsuited to high volume production work. Furthermore, the method is relatively slow.

Another machine (see U.K. Specifications Nos. 1,304,933 and 1,304,413) purports to remove flash as it is formed but in fact this is extremely difficult to achieve in practice, if not impossible. There is no tool material which will withstand the combination of very high temperatures and repeated high loading which this procedure imposes on the tool and the method is not available for adoption in production work.

BRIEF SUMMARY OF THE INVENTION

The invention provides a machine having a simple flash removal means without introducing complication into the friction welding machine. The problems associated with inadequate gripping of the workpieces, displaceable backstops, restriction of the working space and access to it and the production of fine swarf are avoided.

The machine has a tool which is interposable between a workpiece holder and the flash after relative separation of the holder and the flash. Thereafter, the tool and the weld zone are made to traverse relatively to one another to remove the flash by relative approach movement of the holder and the other workpiece holder.

BRIEF DESCRIPTION OF THE DRAWINGS

FIG. 1 is a diagrammatic elevation of a first embodiment of friction welding machine according to the invention FIG. 1A shows typical workpieces;

FIG. 2 is a diagrammatic side elevation of a second form of friction welding machine to which the invention may be applied in a second embodiment thereof;

FIG. 3 is a diagrammatic vertical transverse section of the machine shown in FIG. 2 on the line III—III thereof;

DETAILED DESCRIPTION OF THE PREFERRED EMBODIMENTS

Figure 4:
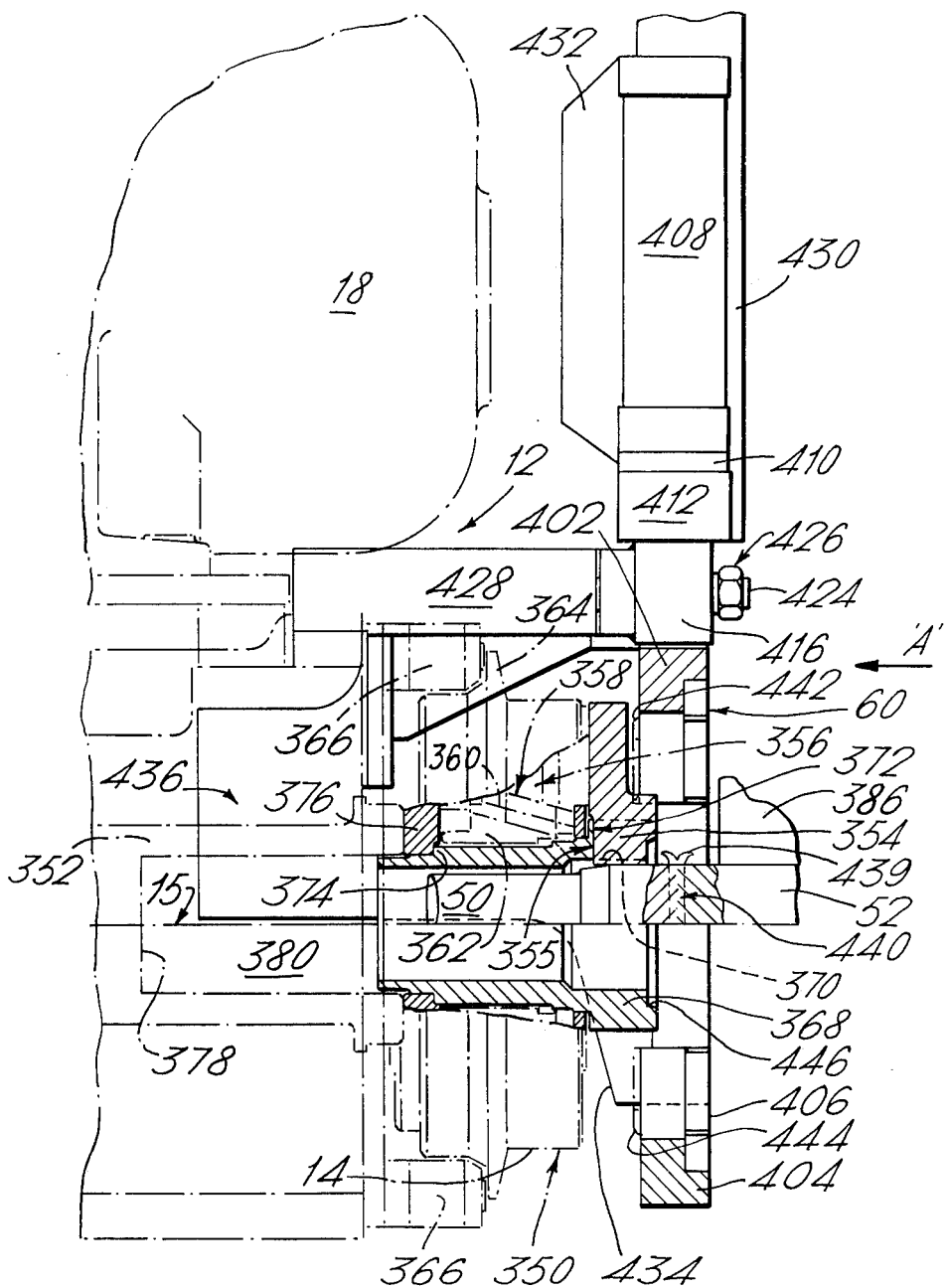
FIG. 4 is a diagrammatic longitudinal section through part of a friction welding machine according to the invention showing flash removal means.

The invention is applicable to various forms of friction welding machine. For example it is applicable to a double-ended sliding-head machine of the kind shown in FIG. 1; it is applicable to single-ended machines, whether of the fixed-head kind shown in FIGS. 2 and 3, or of the sliding-head kind which can be said to be generally equivalent to either half of the machine shown in FIG. 1.

The machine shown in FIG. 1 consists of an elongate generally rectangular support 10 on each half of which are mounted two assemblies. One assembly of the two, in each case, is a sliding-head assembly 12 which includes a chuck 14 and the other assembly 16 includes a clamp which is aligned with the chuck 14 on the rotational axis 15 thereof.

Each head assembly 12 also includes an electric drive motor 18 which is connected by drive means at 20 to the spindle of the chuck 14.

Each head assembly 12 is slidable on slideways 22 running along the top of the support 10 and is movable therealong by a respective hydraulic ram having a cylinder 24 containing a piston connected to an output member 26. The cylinder 24 is pivotally connected at 30 to a reaction member 32. In the machine shown in FIG. 1 the members 32 are secured to respective ends of a box-like construction beam 34 extending through the support 10, which is also of hollow box-like construction and is open at its ends.

Full details of the construction and function of the beam 34 and support 10 in relation to the support of the reaction loads generated by operation of the rams are given in U.S. Pat. No. 3,717,295 assigned to the assignees in respect of the present invention and application. Those details are not otherwise pertinent to the present invention and need not be repeated here.

Alternatively, the beam 34 may be dispensed with and the members 32 secured to the support 10 directly, the support being made strong enough to support reaction loads and resist bending loads to a sufficient degree. FIG. 2 described below shows a ram secured directly to a support in an alternative embodiment.

The machine shown in FIG. 1 also has a central bung or boss 40 secured to the support 10 for the purpose described below.

The machine shown in FIG. 1 is intended for use in the securing of cylindrical end-pieces 50 (see FIG. 1A) by friction welding to opposite cylindrical ends of an automotive vehicle axle housing 52. The housing 52 is of the kind which supports differential gear and drive shafts within is and has a central enlargement 54 with a central aperture 56.

This is achieved by mounting the housing 52 on the support 10 with the clamps in the assemblies 16 gripping the housing 52 on either side of the enlargement 54 and with the bung 40 engaging the housing 52 in the aperture 56. The end-pieces 50 are placed in respective chucks 14 coaxially aligned with the ends of the housing 52. The motors 18 are energised to rotate the chucks 14 and the head assemblies 12 are advanced by the rams 24 to cause the end-pieces 50 to rub against the ends of the housing 52. Heat is generated by the friction between the parts sufficient to bring the metal adjacent the rubbing faces to a condition for welding. At that instant the rams are supplied with increased pressure and at the same time the chucks 14 are disconnected by clutches from the drive motors 18 and brakes are applied to stop the chucks very rapidly. The rams are pressurised for a brief further period to complete the welds.

The procedure so far is generally well-known. The forcing of the workpieces together cause flash and such a ring of flash is formed both internally and externally of the tubular parts, as they are rubbed together.

The present invention is particularly concerned with the removal of such flash immediately after it is formed at the outside of the workpieces. Of course, the invention is equally applicable to solid, as distinct from hollow tubular, workpieces.

The machine shown in FIG. 1 accordingly has flash removal means generally indicated at 60 on each head assembly. The flash removal means are operable to interpose flash cutter means between the flash and one or other assembly holding a workpiece after release of the workpiece from the assembly and after relative withdrawal of assemblies from one another as explained more fully below.

The machine shown in FIGS. 2 and 3 consists of an elongate support 110 on which two assemblies are mounted, a fixed-head assembly 112 which includes a chuck 114 and other assembly 116 which includes a clamp which is aligned with the chuck 114 on the axis of rotation 115.

The head assembly 112 also includes an electric drive motor shown by broken-line outline at 118 which is connected by drive means at 120 to the spindle of the chuck 114.

Alternatively, the motor may be separate from the head assembly as such being provided as shown at 218 and connected by drive means at 220 to the chuck spindle.

In this machine the assembly 116 is slidable on slideways 122 running along the top of the support 10.

The assembly 116 comprises a platform 117 carrying a clamp 119 and another clamp 121 aligned with the clamp 119.

A cross-head 130 is mounted on the support 110 at the end remote from the head assembly 112 and carries a hydraulic ram having a cylinder 124 and a piston connected to an output member 126. The cross-head 130 is connected by tie-rods 132, 134 to the head assembly 112. The platform 117 has pairs of downwardly-extending side-members 136, 138 straddling the lower tie-bar 134 and engaging the slideways 122.

The machine shown in FIGS. 2 and 3 is intended for friction welding a tubular end-piece held in the chuck 114 to an elongate tubular axle member held in the clamps 119 and 121. The method is similar to that described for each end piece welded in the machine shown in FIG. 1 but the tubular axle member in this case is forced along the machine by the output member 126 of the ram towards the end-piece held in the chuck 114. The assembly 116 moves along the support 110 as the ram extends.

The machine shown in FIGS. 2 and 3 has, according to the invention, flash removal means indicated at 160 mounted on the fixed head assembly 112 in a fashion similar to that shown for the machine described with reference to FIG. 1; After welding the assemblies 112 and 116 are in their relatively closest position; the chuck 114 is then released and the ram 124 retracts, thus moving the welded workpieces with the formed ring of flash, away from the chuck 114. The flash removal means 160 is interposed between the chuck 114 and the flash and the ram 124 extends to cause the flash removal means to traverse the weld region to shear off the flash.

The flash removal means is described in detail below with reference to FIGS. 4 and 5 in relation to a sliding head machine (one head only being described) whether single or double-ended. However, the flash removal means is equally applicable to the fixed head machine of FIGS. 2 and 3.

In the description which follows the reference numbers for parts similar to those shown in FIG. 1 are the same as in FIG. 1.

The chuck 14 comprises a housing 350 mounted on a tubular spindle 352 supported by a tapered roller thrust bearing (not shown).

The housing 350 supports three radially movable jaws 354, each secured to a slide member 356. Each slide member 356 has inclined slideways indicated at 358 in which corresponding inclined slide formations 360 fit. The formations 360 are part of an actuator block 362 secured to an actuator ring 364 which is slidable with respect to the housing. The actuator ring 364 is movable by hydraulic actuators 366, two of which are shown.

The actuator ring 364 is urged leftwardly as shown in FIG. 4 by the action of pre-loaded spring assemblies (not shown) mounted in the body of the chuck in generally known manner.

A sleeve 368 is retained in the chuck by the jaws 354 engaging in open slots 370 in the sleeve 368; the rear face 355 of each jaw 354 is in sliding engagement with the rear face 372 of its respective slot 370. The sleeve 368 has a shoulder 374 near its rear end engaging an annular member 376 at the rear of the chuck assembly which is secured to the front end of the mounting 352.

The rear face 378 of a recess 380 of the mounting spindle 352 acts as a backstop for engagement by a workpiece 50 held in the chuck jaws 354. Alternatively, for shorter workpieces, a spacer member (not shown) is introduced into the recess 380 and the workpiece 50 abuts the member which in turn abuts the face 378.

A second workpiece 52 is held in two horizontally movable clamp jaws 386, one of which is partly shown.

The flash removal means 60 (FIG. 5) comprises two shear tool carriages 402, 404; each carriage 402, 404 carries two shear tools 406, but a single tool on each carriage could be used if preferred.

A first, floating hydraulic actuator 408 has its cylinder attached by an annular flange 410 to a block 412 which is connected by two rods 414 to the lower carriage 404. The rods 414 slidably pass through the upper carriage 402 and a member 416 extending transversely of the head 12. The piston rod of the actuator 408 is attached to the upper carriage 402.

Two stops 418 each mounted on rods 420, are attached to the member 416 and pass slidably through the upper carriage 402, to limit the movement of the carriage 402, 404 so as to centralise the shear tools 406 in relation to the central longitudinal axis of the workpiece 50.

The transverse member 416 is connected by bolts 422 (see FIG. 5) to the piston rods of second and third hydraulic actuators (not shown) mounted on the head 12 so as to be movable relative to the chuck 14 parallel to the direction of chuck movement. Movements other than in this direction are opposed by two rods 424 attached by nuts 426 to the member 416; the rods 424 are each slidably mounted in a bore extending through a member 428 rigidly mounted on the head 12.

A member 430, also attached to the block, carries cam members (not shown) for operating limit switches (not shown) carried by a plate 432 attached to the member 416.

Limit switches (not shown) are also associated with the second and third hydraulic axial actuators (not shown).

A bracket 434 is positioned on each side of the head 12 and is bolted to the head 12 at 436. Each bracket has a front member 438 extending inwardly toward the central longitudinal axis of the workpieces 50, 52.

Each shear tool carriage 402, 404 has respective lateral members 403, 405 extending from each side of each carriage 402, 404 and behind the members 438. Thus, the member 438 of each bracket 434 can prevent too great a movement of the shear tool 406 away from the chuck, and also can act as a buffer for the shear tool means should the chuck overrun the limit of its movement toward the clamp.

OPERATION

The chuck is shown in FIG. 4 with the jaws 354 gripping the generally cylindrical workpiece 50, with the left-hand end of the workpiece 50, being in abutting engagement with the face 378 of the recess 380 in the mounting spindle 352. Alternatively, said left-hand end of the workpiece 50 may be in abutting engagement with the face of a spacer member or dolly (not shown) which in turn is in engagement with the face 378 of the recess 380.

The actuator ring 364 is in its extreme left-ward position under the action of its spring assemblies. Thus, the jaws 354 are all urged inwardly to grip the workpiece 50 by the action of the inclined slideways 358 and formations 360.

The workpiece 52 is gripped in the clamp jaws 386 and the righthand end of the workpiece 52 abuts a backstop e.g. the bung 40 of FIG. 1.

The weld has been completed and a ring of external flash 439 has been formed around the weld region 440.

Immediately after the weld is completed, the actuators 366 are energised to push the actuator 64 to the right to cause the jaws 354 to release the workpiece 50 by the action of the slideways 358 and the formation 360. The ram (e.g. ram 24, 26 FIG. 1) is then operated to move the chuck 14 leftwards to provide clearance for the carriages 402, 404 to move inwardly towards the workpiece 50.

The second and third axial actuators (not shown) are then operated to move the member 416, and thus the carriages 402, 404 and the transverse actuator 408, beyond the front of the chuck. The actuator 408 is then operated to move the carriages 402, 404 toward the workpiece 50; the cylinder of the actuator 408 lifts the carriage 404 and the piston rod pushes the carriage 402 down. Centralisation and limit of movement of the carriages 402, 404 is achieved by the stops 418. It is preferred in a typical operation, to limit the inward movement of the shear tools so as to ensure that they are equally spaced slightly from the outer surface of the joined workpieces. This ensures that the flash is symmetrically sheared. Also, since the flash is preferably sheared while it is still hot and plastic, such limits ensure that the shear tools do not engage cold metal.

Once the carriages 402, 404 are in position, the second and third axial actuators (not shown) are reversed to cause the carriages 402, 404 to abut the end of the sleeve 368. The head 12 is then moved to the right by the ram 24 so that the sleeve 368 pushes the shear tools 406 over the weld region 440 to remove the flash formed during welding. The shear tools 406 are shaped so as to split the flash into two pieces as well as to shear it off the welded composite component.

The reaction load during shearing is transmitted to the mounting 352 through the sleeve 368, which contacts the carriages 402, 404.

After separation of the flash, pressure is released from the actuator 408 and the second and third actuators and the chuck is moved leftward to the start position. Frictional drag at the tools 406, particularly in the weld area, causes the member 416 to lag behind the chuck to move the member 406 away from the front of the chuck. If the drag is quite high, the lateral members 403, 405 of the carriages 402, 404 engages the front members 438 of the brackets 434 and are thus limited in the extent they can move in front of the chuck. Actuator 408 is then operated to move the carriages 402, 404 out to their parking positions and the second and third axial actuators (not shown) are then actuated to cause the member 416 to abut against the chuck. The clamp jaws 386 are then released and the composite component removed.

Fresh workpieces are then inserted into the clamp jaws 386, which is then closed, and the jaws 354 which are then closed by de-energising the actuators 366 and a fresh welding cycle can begin.

The tool carriages 402, 404 are held in position only by the actuator 408 during the shearing stage. However, in an alternative construction, semi-circular projections 442, 444 shown in chain dot line in FIG. 4 carried respectively by the carriages 402, 404 are of complementary shape to the recess 446 formed by the front of the sleeve 368 and the jaws 354. Thus, when the second and third axial actuators draw the member 416 back toward the chuck 14, immediately prior to shearing, the projections 442, 444 lock into the recess 446.

In modifications (not shown) applicable to either single-ended sliding-head or to fixed-head machines, the flash removal means may be mounted on the assembly which includes the clamp holding the non-rotatable workpiece (e.g. the assembly 16 in FIG. 1 or the assembly 116 in FIGS. 2 and 3). With that construction, the clamp is released after the weld is formed and then the sliding head or the clamp assembly is withdrawn to allow the flash removal tool to be interposed between the flash and the clamp.

In the case of the single-ended sliding-head machine, the joined workpieces would move with the sliding head as it withdrew, the flash thus moving away from the fixed clamp.

In the case of the fixed-head machine, the clamp would withdraw away from the flash, the workpieces now welded together being still held by the chuck of the fixed head. It must be noted that the assembly 116 is linked to the outpost member 126 so as to be retracted therewith when the ram retracts the output member.

In a further modification the flash removal means may be mounted on the support or on other means independently of either the head or the other assembly.

Figure 6:
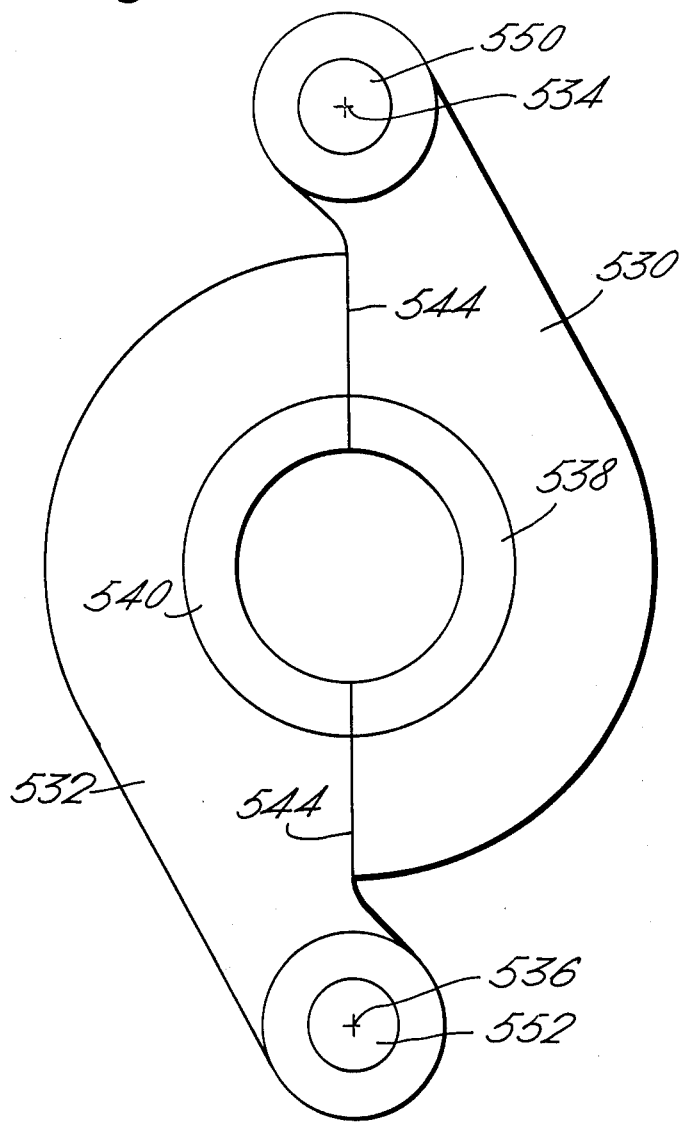
FIG. 6 is a diagrammatic end view of modified shear tool means applicable to friction welding machines according to the invention.

In yet another modification the flash removal means may comprise tools movable angularly into position, illustrated in FIG. 6.

FIG. 6 shows to half-circular shear tools 538, 540 carried by plates 530, 532, respectively, which are pivotable about respective axes 534, 536 parallel to the axis of rotation of the chuck of the machine. The plates 530, 532 meet at faces 544 as shown in their operative positions.

The plates 530, 532 are pivotable outwardly away from their operative positions about respective shafts 550, 552 defining the axes 534, 536, respectively. The shafts 550, 552 can extend forwardly of a sliding head, for example, alongside the second and third actuators described above and the plates can be movable along the shafts 550, 552 by those actuators. The plates can be pivotable by separate actuators into and out of their interposed positions adjacent the flash.

Figure 5:
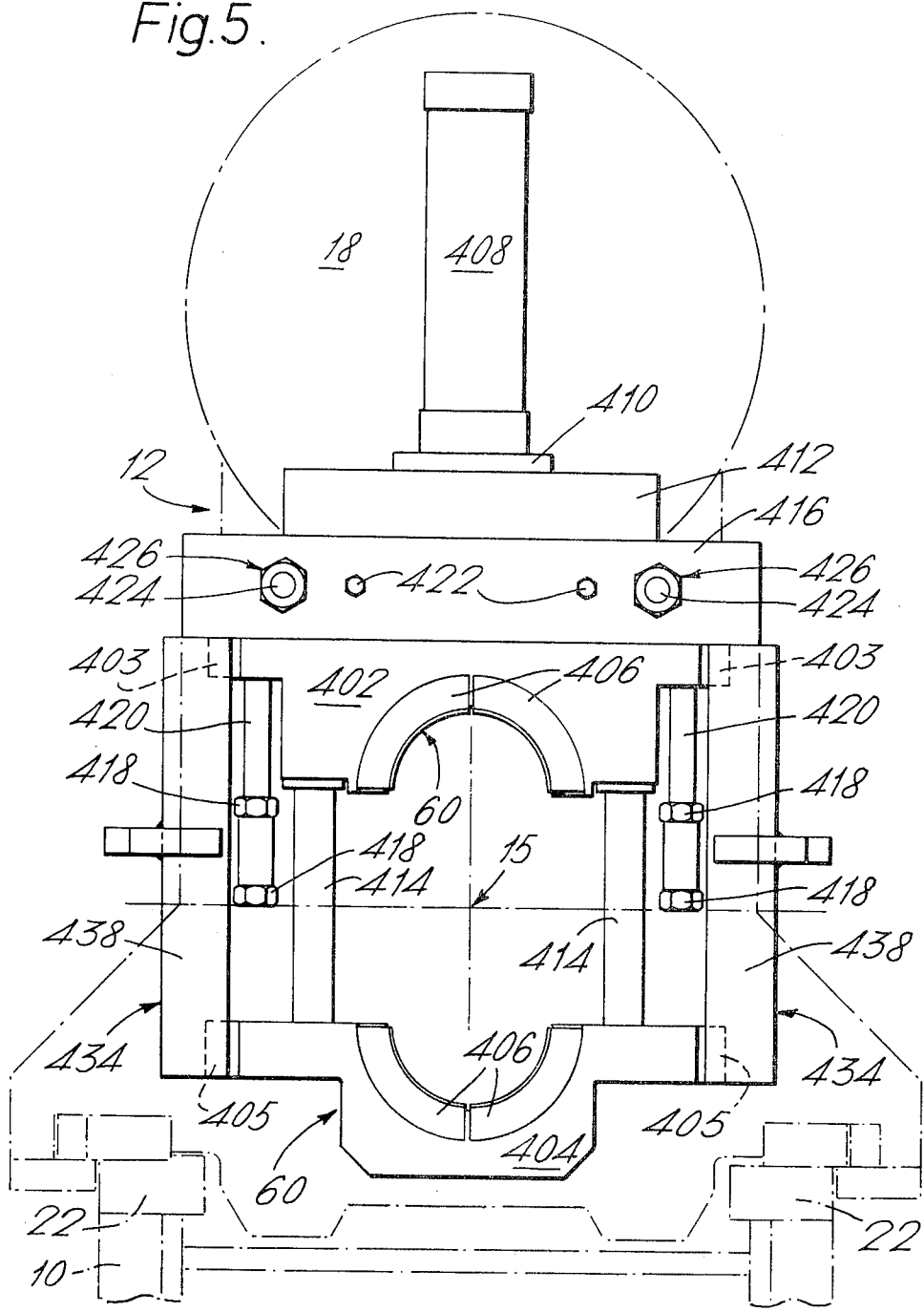
FIG. 5 is a diagrammatic end view of part of the machine shown in FIG. 4.

In the FIG. 1 embodiment, as amplified by FIGS. 4 and 5, it should be noted that a small clearance (of around 20 thousandths of an inch but not shown) normally exists between the front faces of the chuck jaws and the rear faces of the carriages 402, 404 so that the load experienced by the shear tools is not imposed on the chuck jaws except in exceptional circumstances. Normally, all load is taken by the sleeve 368.

In a further alternative, the flash may be sheared by a tool which merely splits the ring at one point so that the ring remains on the welded component and is removed with it from the machine. This is especially advantageous on automotive machines since it simplifies the removal of the flash from the machine.

The leading portions or points of the shear tools can be arranged to enter the gap between the jaws 386 (FIG. 4) so that the workpieces are gripped very closely to the weld region 440 and yet the leading edge of the tool is able to travel right beyond the rightward boundary of the weld region 440 to ensure complete severing of the flash.

The tools can readily be replaced during machine operation. This is important since tool wear is heavy and re-grinding of cutting tools is necessary at intervals.

The shear tool means made up of the carriages 402 and 404 and the cutters 406 are of a combined width such that after they have been interposed between the sleeve 368 and the flash 439, the return movement of the head 12 causes the cutter tools 406 to traverse the weld region 440 completely to shear off the flash entirely. In other words, when the head retracts after the weld is formed and after the chuch has been released, the face 378 of the recess 380 in the spindle 352 is withdrawn from the left-hand end of the workpiece 52 by a certain clearance. The width of the carriages 402, 404 are such that the cutter tools 406 complete the traverse of the weld region 440 during forward movement of the head 12 through a distance less than that certain clearance.

I claim:

1. A friction welding machine comprising a support, two assemblies mounted on the support comprising respectively a first holder means and a second holder means, said first holder means being rotatable about a rotational axis, said first and second holder means being aligned on said rotational axis, means for relatively moving said assemblies along said support in the direction of said rotational axis, said assemblies together, in a relatively closest position, determining a finished weld zone there-between, a drive motor and drive means coupling said drive motor to said first holder means, flash removal means comprising shear tool means, mounting means movably supporting said shear tool means, and mechanism operable to move said shear tool means into and out of a position in which said shear tool means are interposed between one of said assemblies and said finished weld zone axially with said rotational axis, said shear tool means having a width in a direction parallel to said rotational axis such that said shear tool means are movable into said position only after relative separating movement of said assemblies from said relatively closest position to relatively separate said finished weld zone from said one of said assemblies and said width being such that subsequent relative approach movement of said assemblies causes a relative traverse between said finished weld zone and said shear tool means.

2. A friction welding machine according to claim 1, in which said mounting means is carried by said one of said assemblies.

3. A friction welding machine according to claim 1, in which said width is the distance between a shear cutter face means on said shear tool means and an oppositely-facing abutment face means also on said shear tool means, said one of said assemblies having an abutment member engageable with said abutment face means during said relative traverse.

4. A friction welding machine according to claim 3, in which said one of said assemblies is that which comprises said chuck and in which said one assembly comprises a spindle supporting said chuck, said abutment member extending through said chuck in load-transfer relationship with said spindle.

5. A friction welding machine according to claim 4, in which said abutment member has slots and in which said chuck has jaws extending each through a respective one of said slots.

6. A friction welding machine according to claim 1, in which said mounting means supports said tool means for movement which includes movement parallel to said rotational axis.

7. A friction welding machine according to claim 6, in which said mechanism comprises first actuator means operable to move said tool means parallel to said rotational axis and second actuator means operable to move said tool means into and out of said interposed positions.

8. A friction welding machine according to claim 1, in which said shear tool means comprise two opposed carriages carrying shear cutter tools, said carriages being supported by said mounting means for movement into and out of said interposed position by said mechanism.

9. A friction welding machine according to claim 1, in which said shear tool means are movable angularly into and out of said interposed position.

10. A friction welding machine comprising a support, two outer assemblies mounted on the support, each comprising a chuck rotatable about a rotational axis, and an intermediate assembly mounted on the support comprising a clamp aligned with said chucks on said rotational axis, means for moving each said outer assembly along said support in the direction of said rotational axis, each said outer assembly and said intermediate assembly together, in a respective relatively closest position, determining a respective finished weld zone therebetween, each said outer assembly having a respective drive motor and drive means coupling said drive motor to the respective chuck, there being provided for each finished weld zone flash removal means comprising shear tool means, mounting means movably supporting said shear tool means, and mechanism operable to move said shear tool means into and out of a respective position in which said shear tool means are interposed between the respective one of said outer assemblies and the respective finished weld zone coaxially with said rotational axis, each said shear tool means having a width in a direction parallel to said rotational axis such that said shear tool means are movable into said respective position only after separating movement of the respective outer assembly from said respective relatively closest position to separate the respective finished weld zone from the respective outer assembly, and said width being such that subsequent approach movement of said respective outer assembly causes a traverse of the respective finished weld zone by the respective shear tool means.

* * * * *